Patented Aug. 16, 1938

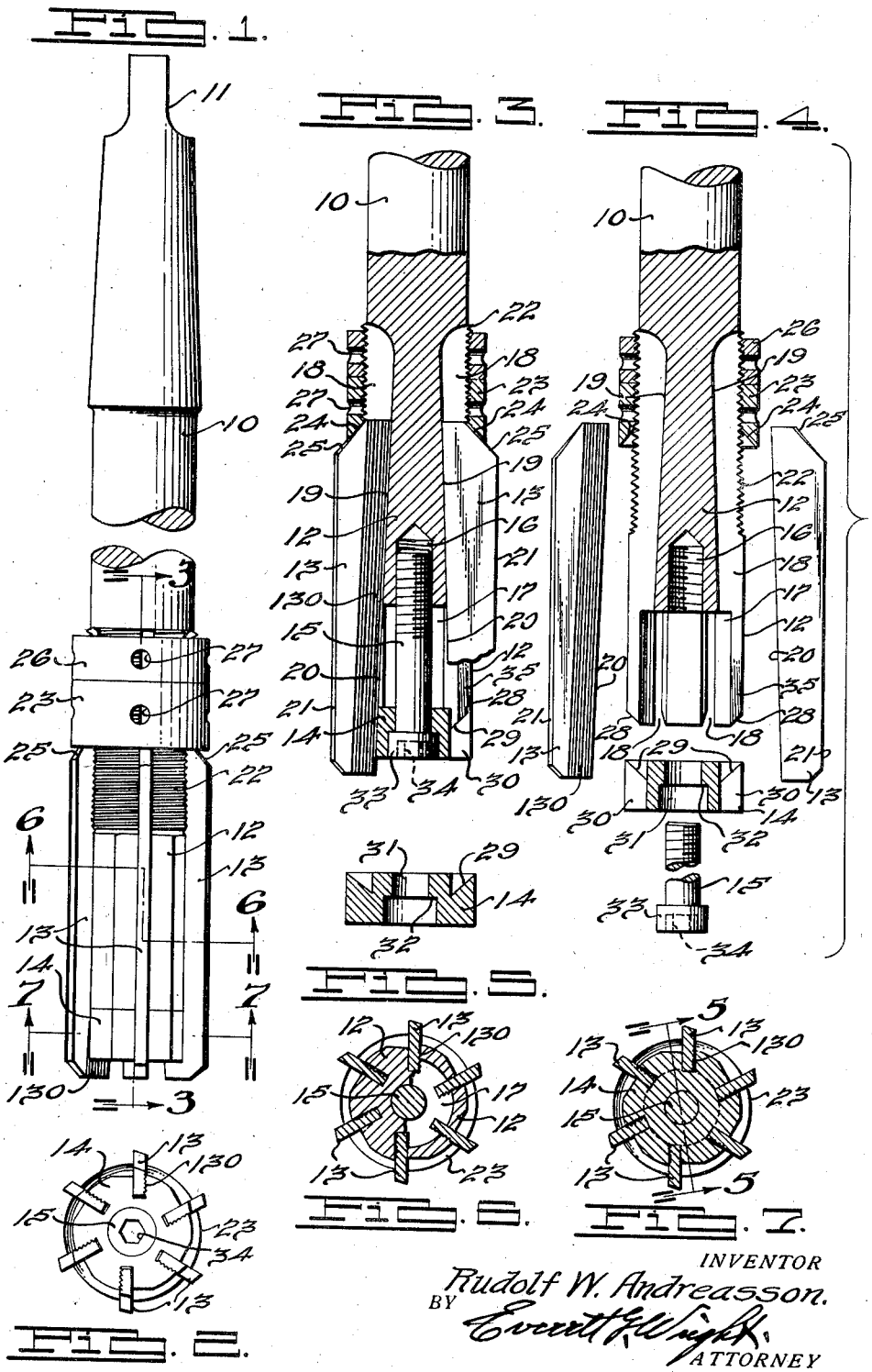

2,127,457

UNITED STATES PATENT OFFICE 2,127,457

REAMER

Rudolf W. Andreasson, Detroit, Mich.

Application October 4, 1937, Serial No. 167,112

4 Claims. (Cl. 77—75.5)

This invention relates to reamers and in particular to adjustable blade type reamers and means for positively locking the blades thereof in their adjusted position.

The main object of this invention is to provide an adjustable blade type reamer having a simple, sturdy, quick acting locking means for positively securing the blades thereof in their adjusted position.

Another object of the invention is to provide an adjustable blade type reamer in which the blades thereof may be secured in their adjusted position by a single locking operation.

Another object of the invention is to provide an adjustable blade reamer including serrated blades therefor and means for locking the said serrated blades into a vise-like biting engagement with the reamer body.

Other objects of the invention will become apparent by reference to the following detailed description taken in connection with the accompanying drawing, in which:

Fig. 1 is a vertical elevational view of an adjustable blade type reamer embodying the invention.

Fig. 2 is a bottom view of the embodiment of the invention disclosed in Fig. 1.

Fig. 3 is a vertical sectional view taken on the line 3—3 of Fig. 1.

Fig. 4 is a vertical sectional view similar to Fig. 3 except exploded to better show the invention.

Fig. 5 is a cross sectional view of the blade locking nut taken on the line 5—5 of Fig. 7.

Fig. 6 is a cross sectional view taken on the line 6—6 of Fig. 1.

Fig. 7 is a cross sectional view taken on the line 7—7 of Fig. 1.

Referring now to the drawing wherein like numerals refer to like and corresponding parts throughout the several views, the novel reamer disclosed therein comprises, in general, a shaft 10 having the upper tapered end thereof suitably formed at 11 for engagement by means for rotating the same, and a lower main body portion 12 formed to accommodate a plurality of cutting blades 13 which are securely fixed in the said main body portion 12 by a novel locking nut 14 and a single set screw 15.

The main body portion 12 of the reamer is centrally bored and counterbored at 16 and 17 respectively from the bottom thereof and is provided with a plurality of vertically disposed tapered slots 18 preferably equally spaced around the periphery of the said main body portion 12, one slot 18 being provided for each cutting blade 13 used. The base 19 of each of the tapered slots 18 is deeper toward the upper portion of the said slots 18 than at the bottom thereof. Each slot 18 is preferably disposed with one edge thereof on a radius from the center of the said main body portion 12, see Figs. 2, 6 and 7.

Each cutting blade 13 has the inwardly disposed bearing edge 20 thereof vertically tapered with respect to the outwardly disposed cutting edge 21 thereof on an angle complementary to the base 19 of the said vertically disposed tapered slots 18 in the main body portion 12.

The upper part of the main body portion 12 of the reamer is threaded at 22 to accommodate a blade retaining collar 23 having a re-entrantly beveled lower face 24 against which the complementarily upper beveled ends 25 of the cutting blades 13 are compressed when locked in the reamer as hereinafter described. The adjusted location at which the collar 23 is positioned on the main body portion 12 of the reamer determines the adjusted diameter of the cutting edges 21 of the said cutting blades 13 thereof which are disposed in the tapered slots 18 because of the fact that the bearing edges 20 of the said cutting blades 13 and the bases 19 of the said tapered slots 18 are complementarily beveled. A lock nut 26 on the upper threaded part 22 of the main body portion 12 secures the blade retaining collar 23 in its adjusted position thereon when turned tightly thereagainst. Wrench apertures 27 are preferably provided in the blade retaining collar 23 and the lock nut 26.

The bottom of the main body portion 12 of the reamer is beveled as at 28 for engagement by the complementarily re-entrantly beveled upper face 29 of the blade locking nut 14 which is provided with one vertically disposed slot 30 for each vertically disposed slot 18 in the main body portion 12 of the reamer equally spaced around the periphery of the said nut 14 whereby to permit the said nut 14 to be positioned over the lower depending ends of the cutting blades 13 after the said cutting blades 13 have been positioned in the vertically disposed slots 18 in the main body portion 12 of the reamer and urged against the blade retaining collar 23 thereof as best shown in Fig. 3. The said blade locking nut 14 is centrally bored and counterbored at 31 to provide a shoulder 32 for engagement by the head 33 of the set screw 15 when turned into the threaded bore 16 in the said main body portion 12 of the said reamer. A suitable socket 34 is provided in the head 33 of the said set screw 15 to permit the said set screw 15 to be engaged and turned by suitable tightening means.

When the locking nut 14 engages the lower beveled end 28 of the main body portion 12 of the reamer after the cutting blades 13 have been suitably inserted therein against the upper blade retaining collar 23 and against the base 19 of the vertically disposed slots 18 thereof, the set screw 15 is tightened whereupon the said locking nut 14 causes the lower slotted end of the main body portion 12 of the reamer to grip the cutting blades 13 thereof thereby securing the said blades tightly therein, quickly and positively with a single locking operation.

If and when reamers are subjected to heavy duty it may be desirable to lock the cutting blades 13 thereof positively into substantially integral engagement with the main body portion of the reamer. In which event, the cutting blades 13 are suitably deformed, as, for example, by forming serrations 130 in the trailing side thereof with respect to the rotation of the reamer into which they are to be locked, prior to the hardening of the said cutting blades 13. By the use of such serrated and hardened cutting blades 13 in combination with the novel reamer and blade blocking means disclosed herein, the said cutting blades 13 cut into the surface of the slotted main body portion 12 near the bottom thereof as indicated by the numeral 35 in Figs. 3 and 4 whereupon a vise like biting engagement between the slotted main body portion 12 and the serrated sides 130 of the cutting blades 13 is accomplished as indicated in the right hand half of Fig. 6.

Although but one embodiment of the invention has been disclosed and described herein, it is to be understood that various changes including the size, shape, arrangement and detail of the parts thereof may be made without departing from the spirit of the invention and it is not intended to limit the scope thereof other than by the terms of the appended claims.

I claim:

1. A reamer comprising, in combination, an upper shaft and a lower main body portion having its lower end beveled, the said main body portion being axially bored and counterbored at the bottom thereof and provided with a plurality of vertically disposed circumferentially spaced slots to accommodate a plurality of cutting blades, a cutting blade disposed in each of the said slots in the main body portion, means threaded on the upper end of the said main body portion adapted to retain the top of the said cutting blades in said slots in the main body portion when urged thereagainst, a blade locking nut adapted to telescopingly receive the lower ends of the said cutting blades and draw the lower beveled end of the said main body portion radially inward when urged thereagainst, and means threaded in said axial bore for urging the said locking nut axially upward whereby to cause the said lower slotted end of the said main body portion to grip the said cutting blades thereby securing the said cutting blades tightly in the said reamer.

2. A reamer comprising, in combination, an upper shaft and a lower main body portion having its lower end beveled, the said main body portion being axially bored and counterbored from the bottom thereof and provided with a plurality of circumferentially spaced axially extending radially tapered slots deeper near the top thereof than at the bottom thereof, a complementarily tapered cutting blade disposed in each slot having its upper outer corner beveled, a blade retaining collar threaded on the upper end of the said main body portion having a re-entrantly beveled lower face against which the upper beveled ends of the said cutting blades compress when locked in the reamer, a blade locking nut having a like circumferentially spaced axially extending slot therein for each slot in the main body portion of the reamer and a re-entrantly beveled upper annular face adapted to telescopingly receive the lower ends of said cutting blades and engage the beveled bottom of the said main body portion of the reamer in such a manner as to draw the lower end of the said reamer body radially inward when urged thereagainst, and a set screw threaded in the said axial bore of the said main body portion of the reamer adapted to urge the said blade locking nut against the beveled bottom thereof whereby to cause the lower slotted end of the main body portion of the said reamer to grip the said cutting blades and secure the said cutting blades tightly in the said reamer.

3. A reamer comprising, in combination, an upper shaft and a lower main body portion having its lower end beveled, the said main body portion being axially bored and counterbored from the bottom thereof and provided with a plurality of circumferentially spaced axially extending radially tapered slots deeper near the top thereof than at the bottom thereof, a complementarily tapered cutting blade having at least one side thereof serrated disposed in each slot having its upper outer corner beveled, a blade retaining collar threaded on the upper end of the said main body portion having a reentrantly beveled lower face against which the upper beveled ends of the said cutting blades compress when locked in the reamer, a blade locking nut having a like circumferentially spaced axially extending slot therein for each slot in the main body portion of the reamer and a re-entrantly beveled upper annular face adapted to fit over the lower ends of said cutting blades and engage the beveled bottom of the said main body portion of the reamer in such a manner as to draw the lower end of the said reamer body radially inward when urged thereagainst, and a set screw threaded in the said axial bore of the said main body portion of the reamer adapted to urge the said blade locking nut against the beveled bottom thereof whereby to cause the lower slotted end of the main body portion of the said reamer to grip the said cutting blades at the serrations therein and secure the said cutting blades tightly in the said reamer with a vise like biting engagement therewith.

4. A reamer comprising, in combination, an upper shaft and a lower main body portion having its lower end beveled, the said main body portion being axially bored and counterbored from the bottom thereof and provided with a plurality of circumferentially spaced axially extending radially tapered slots deeper near the top thereof than at the bottom thereof, a complementarily tapered cutting blade disposed in each slot having its upper outer corner beveled, a blade retaining collar threaded on the upper end of the said main body portion having a re-entrantly beveled lower face against which the upper beveled ends of the said cutting blades compress when locked in the reamer, a blade locking nut having a like circumferentially spaced axially extending slot therein for each slot in the main body portion of the reamer and a re-entrantly beveled upper annular face adapted to telescopingly receive the lower ends of said cutting blades and engage the beveled bottom of the main body portion of the said reamer in such a manner as to draw the lower end of the said reamer body radially inward when urged thereagainst, and means for urging the said locking nut upwardly against the beveled bottom of the said reamer.

RUDOLF W. ANDREASSON.